Figure 1:
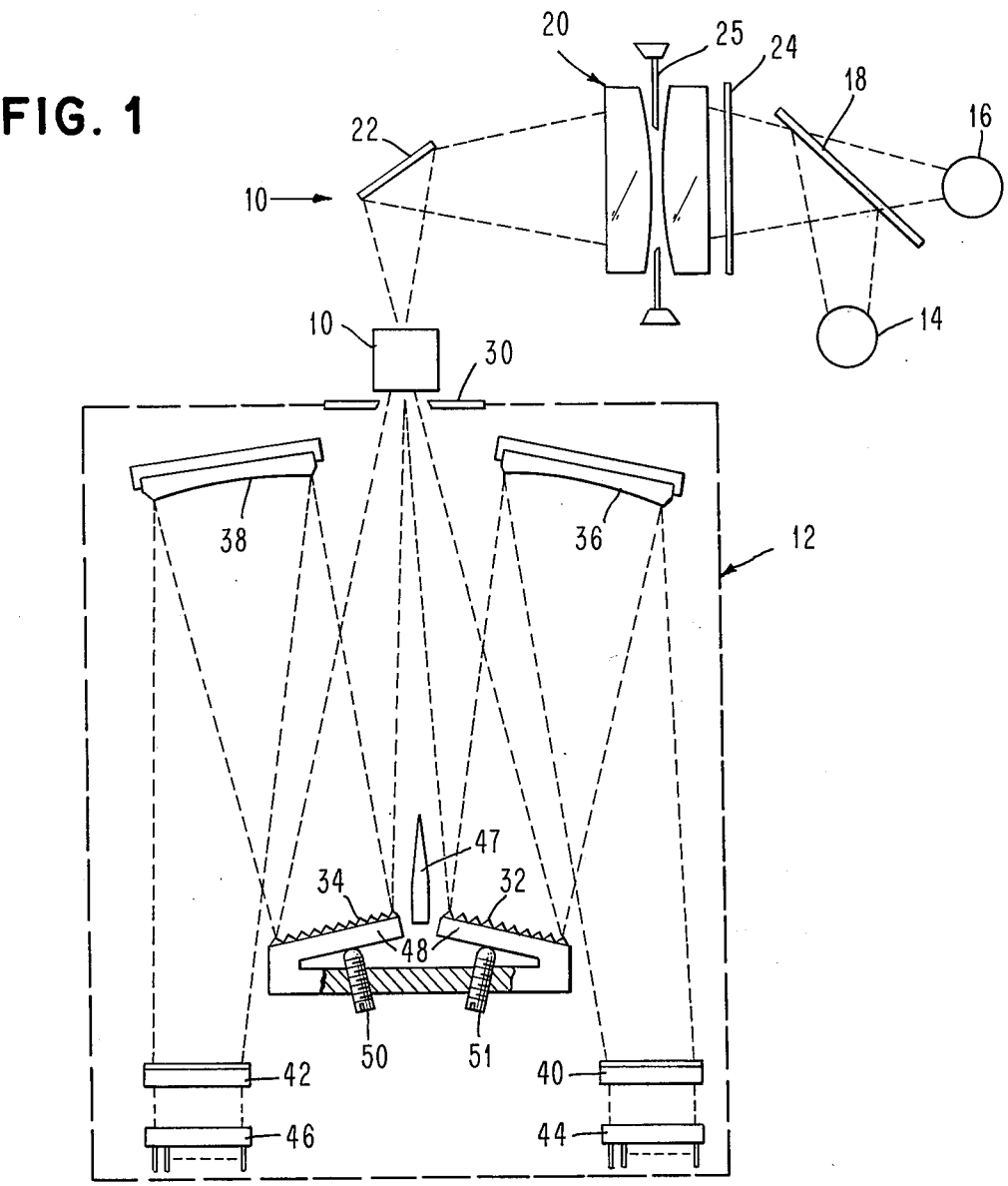

United States Patent [19]

Jacobowitz et al.

[11] 4,060,327

[45] Nov. 29, 1977

[54] WIDE BAND GRATING SPECTROMETER

[75] Inventors: Lawrence Jacobowitz; Einar S. Mathisen, both of Poughkeepsie; Lawrence D. Thorp, Yorktown, all of N.Y.

[73] Assignee: International Business Machines Corporation, Armonk, N.Y.

[21] Appl. No.: 722,944

[22] Filed: Sept. 13, 1976

[51] Int. Cl.² .................... G01J 3/42; G01J 3/12
[52] U.S. Cl. ..................... 356/96; 350/162 R; 356/99; 356/100
[58] Field of Search ................. 356/79, 96, 97, 98, 356/99, 100, 101; 350/162 R

[56] References Cited

U.S. PATENT DOCUMENTS 3,733,131  5/1973  Mould ........................... 356/100
3,791,737  2/1974  Johansson ...................... 356/99

Primary Examiner—Vincent P. McGraw
Attorney, Agent, or Firm—Douglas R. McKechnie

[57] ABSTRACT

A spectrophotometer includes an illumination section for illuminating a test sample, and a spectrometer portion for receiving light from a test sample and measuring the radiant energy thereof as a function of wavelength. The spectrometer includes an entrance slit and two stationary gratings for dispersing light admitted through the slit into two separate dispersed beams or spectra. The separate beams are focused upon linear arrays of photodiodes providing outputs proportional to the intensity of the light rays at the different wavelengths received thereby. The gratings produce different primary orders of dispersion so that the efficiency of operation thereof is relatively high across a relatively wide band of radiant energy.

7 Claims, 2 Drawing Figures

U.S. Patent    Nov. 29, 1977    4,060,327

WIDE BAND GRATING SPECTROMETER

SUMMARY OF THE INVENTION

This invention relates to the field of spectrometry and, more particularly, to improvements in spectrometers of the type having gratings for dispersing light beams into waves of different wavelengths.

As is known, spectrometry is concerned with measuring the wavelengths of rays of a spectrum, a spectrum being the series of images formed when a beam of wide band radiant energy is dispersed and brought to focus so that the component rays or radiant energies are arranged in the order of their wavelengths. A conventional spectrometer comprises a slit through which the beam to be analyzed or measured passes, a dispersive element, a detector, and some form of lens or means for focusing the dispersed images of the slit on the detector.

Two common forms of dispersive elements are prisms and gratings, either holographic or diffraction. The use of gratings is advantageous over prisms in that these devices produce normal spectra, i.e., one in which the dispersion is relatively constant so that equal distances correspond to equal wavelength intervals. The prevent invention is designed as an improvement in spectrometers of the type which use some form of grating as the dispersive element.

The characteristics of gratings are well known. One characteristic noted above is that they produce normal spectra. Another is that they can produce the spectrum through reflection or transmittance. Another is that they produce several orders of dispersion, a primary order, a secondary order, etc. A further one is that the dispersive characteristics of the gratings are dependent upon the ruling or line density and the spectrum produced in each order has a variable efficiency across such spectrum. In other words, each grating is designed to produce an optimum efficiency or maximum efficiency at a given wavelength and this efficiency drops off as the wavelengths are further separated from the design wavelength. In other words, gratings are normally produced to operate with a certain degree of efficiency over pre-determined ranges.

This range limitation is recognized and various spectrometers have been devised that are designed to overcome it. Examples are disclosed in U.S. Pat. Nos. 3,306,158 — Makabe et al., 3,390,604 — Makabe and 3,472,595 — Hashizume. Each of these patents shows the use of two or more gratings each having a different primary order of dispersion. However, each of these patented inventions is disadvantageous relative to the present invention in that the patented inventions involve the use of moving parts for either moving the gratings into and out of the path of the beam to be analyzed or moving a mirror so as to reflect the beam from one grating when in one position or allow the beam to be incident on another grating in another position. In contrast to these patented inventions, applicants' invention involves no moving parts and thus is capable of a high speed operation without having parts subject to wear and deterioration. Also, applicants' invention provides a simultaneous readout of beams dispersed by two gratings, whereas, in the patented inventions, only one grating is used at any given time.

U.S. Pat. No. 3,523,734 — Brehn et al., discloses a spectrometer in which a diffraction grating has a central portion ruled to disperse over a first range and two side portions designed to disperse over a second range of wavelengths. The spectrometer and diffraction grating is arranged to include a conventional Rowland circle having a series of slits around its perimeter beind which are located photomultiplier tubes. The images from the different rulings on the diffraction grating are superimposed at the surface of the Rowland circle and therefore need to be separated. The separation is accomplished through the use of masks and filters. While such a spectrometer has an extended range, it nevertheless operates so that the instrument is not continuous across the ranges. By this is meant, the patented invention is designed so that at a given exit slit, where there might be two beams of different radiant energy at one time, only one of these beams is detectable and therefore the instrument does not provide continuous readout across the entire range of both dispersed beams. In addition, the Rowland circle is in the order of 75 centimeters and produces a somewhat bulky instrument. In contrast, applicants' invention provides high efficiency readings continuously across the entire waveband of the spectrometer which, as pointed out in more detail hereafter, is produced by using two gratings of different wavelength ranges.

Another aspect of applicants' invention is the use of a linear array of photodiodes capable of operation at high speeds to produce output signals at different wavelengths. Relative to this aspect, U.S. Pat. No. 3,973,849 — Jackson et al, assigned to the assignee of the present invention, discloses a spectrophotometer using a linear array of photodiodes having two lines of such diodes that are separately energized with different ranges of dispersed beams. A single grating is used that is movable between two different positions. When in one position, one of the lines of photodiodes is activated and when in the other position the other line is activated so as to produce readouts at the respective wavelengths of the different bands. As will be appreciated from the more detailed description below, applicants' invention distinguishes this patent in that first there are no moving parts, the gratings being stationary and their being no need to move them or mask or other deflective type devices. Additionally, applicants' invention provides a continuous read-out or concurrent read-out across the entire range of the instrument rather than the read-out first in one wavelength range and then in the other. Additionally, applicants' invention provides a higher efficiency spectrometer with a better signal-to-noise ratio because the patented invention uses a single grating which, because it is operated across a wide range, would inherently be less efficient at the extremes of such ranges because of the characteristics of the grating.

In view of the foregoing, it is the principal object of applicants' invention to provide a spectrometer operable over a wide range of wavelengths and at high speeds without using any movable parts.

Another object of the invention is to provide a spectrometer using two stationary dispersion gratings providing a high efficiency wide band response.

Still another object is to provide a spectrometer having at least two gratings that simultaneously disperse a beam to be analyzed into two dispersed beams, the spectrometer also including detector means for providing output signals of the energy content of both dispersed beams.

A further object is to provide a high speed spectrometer using dispersion gratings and linear photodiode arrays providing output signals at the respective wavelengths of rays dispersed by the gratings.

Briefly stated, the manner in which the above and other objects of the invention are achieved is to provide a spectrometer having two gratings each with a different primary order of dispersion providing a relatively high efficiency output across the respective ranges of wavelengths associated with the dispersion. Two linear photodiode arrays are used as detectors. A slit admits a beam of light to be analyzed into the spectrometer which beam is dispersed by the gratings into two separate spectrum or dispersed beams. Means are also provided for focusing the image of the slit in the dispersed beams on the arrays so that the outputs of successive ones of the photodiodes within each array represents the intensity of the light at successive wavelengths across the measurement range of the wavelengths.

Figure 2:
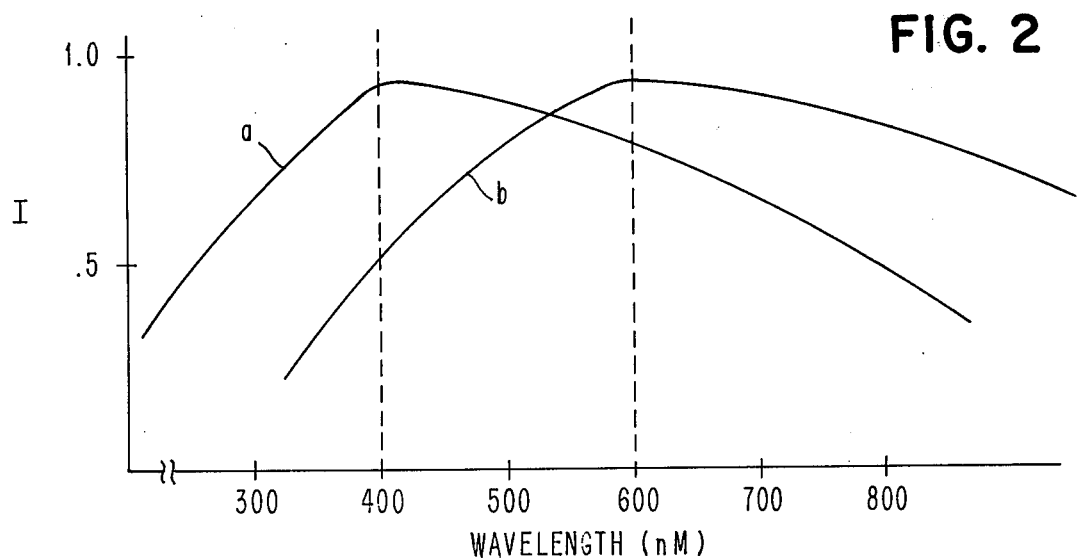

Other objects and advantages of the invention will be apparent from the following description of a preferred embodiment of the invention taken in connection with the accompanying drawing wherein:

FIG. 1 is a schematic view of a spectrophotometer embodying the invention;

and FIG. 2 is an exemplary graph of typical characteristics of gratings embodied in the embodiment of FIG. 1, showing the relative efficiency versus wavelength of the gratings.

Referring now to the drawing, FIG. 1 schematically shows a spectrophotometer for analyzing a sample within a test cell 11 by analyzing the spectral characteristics of a beam of light transmitted through the sample. The spectrophotometer includes an illumination section or means 10 for directing a wide band of radiant energy through sample 11 and a spectrometer section or means 12 for measuring the wavelength characteristics of light transmitted through the sample. Illumination section 10 includes two light sources 14 and 16 that are different to provide a wide band of radiant energy, the light sources being selectively energizable so that either one or the other or both may be on at a given time. Source 11 may comprise a conventional deuterium lamp which is strong in the ultraviolet region and source 16 may be a conventional tungsten lamp. Both lamps radiate energy through the ultraviolet, visible and infrared portions of the light spectrum. A beam splitter 18 allows light from source 16 to pass therethrough while reflecting light from source 14, through a lens 20. Light from the lens is reflected by a mirror 22 into test cell 11, lens 20 being operative to focus the images of the filaments of light sources 14 and 16 at the central portion of the test cell. A neutral density filter 24 may be used to attenuate light to prevent saturation of the photodiodes described below. Neutral density filter 24 may be one of a series of different filters mounted on the edge of a wheel and rotatable into position to provide different attenuation characteristics. An iris diaphragm 25 may be also used to control the F-number of light passing through the illumination section.

Spectrometer section 12 includes an elongated adjustable rectangular entrance slit 30 the length of which would be normal to the view of FIG. 1. Test cell 11 is disposed next to entrance slit 30 so that light from the test cell passes through the entrance slit and forms the beam of light energy to be analyzed by spectrometer 12. Spectrometer 12 includes two gratings 32 and 34 which may be either a holographic type gratings or diffraction gratings, in which the rulings or lines are parallel to slit 30. Slit 30 is preset to permit entrance of a core of light of sufficiently low F-number so as to illuminate both gratings simultaneously. Gratings 32 and 34 are disposed in the path of the beam passing through slit 30 but reside in different portions of the beam and are operative to form two different dispersed beams that are directed or reflected onto mirrors 36 and 38. These mirrors respectively focus the images of slit 30, as dispersed by gratings 32 and 34, upon the first surfaces of cylindrical lenses 40 and 42, these lenses being operative to longitudinally compress the slit images into lines focused on the lines of photodiodes contained within arrays 44 and 46. Gratings 32 and 34 may be mounted upon a flexure type tuning mounting 48 in which set screws 50 and 51 can be adjusted. A baffle 47 is disposed between gratings 32 and 34 to minimize or eliminate the effects of any stray light around the gratings.

Gratings 32 and 34 are conventional construction would be selected according to the wavelength desired to be analyzed by the system. The manner of selection might be best understood relative to FIG. 2 with the assumption that graph A represents the characteristics of a diffraction grating used as grating 32 and graph B represents the characteristics of a diffraction grating 34. As is known, the spectral region where the efficiency of the grating is greater than 50% extends from approximately two-thirds of the blazed wavelength to twice the blazed wavelength. Assuming grating 32 is blazed for nominal wavelength of 400 nanometers (nm) the range of wavelength at which the grating operates greater than 50% efficiency extends from 267 to 800 nm. Similarly, for grating 42, if it is blazed at the nominal wavelength of 600 nm., the range of wavelengths having an efficiency greater than 50% extends from 400 to 1200 nm. If we assume that the desired system response is to utilize efficiency of at least 50%, then the range of the instrument is from 267 to 1200 nm. for the particular gratings blazed at 400 and 600 nm. With such a wide range, the gratings can be adjusted so as to direct wavelengths of one half this range upon array 44 and the wavelengths of the other half of the range upon array 46. With such example, array 44 would be operative to cover the wavelengths from 267 to 734 nanometers and array 46 would cover the range 734 to 1200 nm. Narrower ranges can be selected for operation at higher efficiencies as desired and as might be required by different applications.

Arrays 44 and 46 are preferably of a solid state line scanner type available from Reticon Corp., Mountainview, California which contain linear arrays of silicon photodiodes having integrated scanning circuits for a serial readout. Such arrays include a line of photodiodes arranged on 1 mil centers with a 17 mil wide apertures, the arrays being available with from 128 to 1024 photodiodes. The arrays provide output signals proportional to the relative intensities of light received by each of the individual diodes. By arranging the dispersed beam to fall upon the diodes as shown in the drawing, each of the successive diodes will represent a successively different nominal wavelength which, because the gratings produce a normal spectrum, is substantially linear.

The linear arrays are self-scanning and are operable with frequencies ranging from 10kHz to 10MHz to thus provide a high speed operation. It is preferred that the arrays be further connected to suitable amplifiers and to a digital processing system whereby the outputs thereof can be analyzed at the high rates of speed associated with modern day data processing systems. However, the connection of the spectrometer to the system and operation thereof would be in any conventional fashion and form no part of the present invention.

In the general operation of the instrument, it would be expected that calibration is necessary and this could be accomplished in conventional fashion using a series of discrete interference type of filters placed in the beam and noting which of the photodiodes produces the greatest response thereto. The spectrometer is versatile and can be used where the entire spectrum is of interest, that is where it is desired to provide output signals of all the intensities across the wavelengths of the band of radiant energy received thereby or it may be selective and operated only for a given wavelength or limited number of wavelengths of interest. For example, with some test samples, the absorbance or transmittance at a given wavelength is the data of interest and the spectrometer output can be analyzed accordingly and limited only to the specific wavelengths.

It should also be apparent to those skilled in the art that many changes can be made in the details and arrangement of parts without departing from the spirit and scope of the invention as defined in the appended claims. One change that should be readily apparent would be to substitute or use holographic gratings which can be obtained whereby, in addition to their dispersion characteristics, they can also be used to focus the dispersed beams. In such a system, the grating and focusing means are combined so that they can directly form the slit images upon the arrays. Other forms of illumination might be substituted, and, instead of using a steady illumination system, one that is pulsed or comes from sparking or similar operations might be used in which case the spectrometer, because of the high speed operation, can readily provide the desired printout.

It should be obvious that various changes can be made in the details and arrangements of parts and steps without departing from the spirit and scope of the invention as defined in the appended claims.

What is claimed is:

1. In a spectrometer for measuring the intensities of radiant energies within a beam of light across different wavelengths thereof, said spectrometer including an elongated rectangular entrance slit for admitting said beam, the combination comprising:
   first and second stationary gratings disposed in the path of said beam admitted by said slit, each of said gratings having lines parallel to said slit, the lines of each grating being different to produce different primary orders of dispersion, said gratings being operative to dispense light in said beam into two separated dispersed beams;
   first and second arrays of photodiodes, said photodiodes being arranged in each array along a line and operative to produce output signals proportional to the intensities of rays of radiant energies illuminated thereby;
   and means for focusing said dispersed beams separately on said arrays so as to image said slit thereon, whereby successive photodiodes in each array produce outputs proportional to the intensities in rays of successive wavelengths.

2. The combination of claim 1 wherein:
   said photodiodes are evenly spaced along said lines whereby the differences in wavelengths between successive photodiodes is substantially equal across each array.

3. The combination of claim 2 wherein said focusing means comprises cylindrical lens means disposed next to said arrays and operative to converge the rays in said dispersed beams on said photodiodes.

4. The combination of claim 1 wherein:
   said gratings prcduce orders of dispersion such as to having an efficiency above a predetermined level across a continuous spectrum of a width greater than the width of the spectrum within each order at such level.

5. The combination of claim 1 additionally comprising:
   illumination means for illuminating a test sample and directing radiant energy from the sample into said beam passing through said slit, said illumination means comprising at least one polychromatic light source, and optical means for directing light onto the sample.

6. The combination of claim 2 wherein:
   said arrays are arranged in said dispersed beams wherein said photodiodes of said first array are activated by rays within a first band of wavelengths and said photodiodes of said second array are activated by rays within a second band of wavelengths contiguous to said first band to thereby allow measurements to be made continuously across both bands.

7. The combination of claim 6 wherein:
   said gratings produce orders of dispersion wherein the efficiency of rays within said first and second bands is above a predetermined level.

* * * * *